United States Patent
Austin et al.

(10) Patent No.: US 6,175,376 B1
(45) Date of Patent: Jan. 16, 2001

(54) PRINTHEAD HAVING MULTIPLE PRINT LINES, AND METHOD AND APPARATUS FOR USING SAME

(75) Inventors: Pixie A. Austin, Everett; Edward M. Millet, Seattle; David S. Nierescher, Renton; Christopher A. Wiklof, Everett, all of WA (US)

(73) Assignee: Intermec IP Corp., Woodland Hills, CA (US)

( * ) Notice: Under 35 U.S.C. 154(b), the term of this patent shall be extended for 0 days.

(21) Appl. No.: 09/339,337

(22) Filed: Jun. 23, 1999

Related U.S. Application Data

(60) Continuation of application No. 08/869,804, filed on Jun. 4, 1997, now Pat. No. 6,025,861, which is a division of application No. 08/156,266, filed on Nov. 22, 1993, now Pat. No. 5,675,370.

(51) Int. Cl.$^7$ ........................................... B41J 2/36
(52) U.S. Cl. ................................. 347/188; 347/221
(58) Field of Search ................... 347/171, 183, 347/188, 184, 195, 211, 186

(56) References Cited

U.S. PATENT DOCUMENTS

| | | | |
|---|---|---|---|
| 3,984,844 | 10/1976 | Tanno et al. | 347/209 |
| 4,074,109 | 2/1978 | Baraff et al. | 219/216 |
| 4,074,280 | 2/1978 | Kojima et al. | 347/211 |
| 4,203,025 | 5/1980 | Nakatani et al. | 219/216 |
| 4,251,822 | 2/1981 | Hara et al. | 347/139 C |
| 4,298,786 | 11/1981 | Marciniec | 219/216 |
| 4,462,704 | 7/1984 | Kurata et al. | 400/120 |
| 4,611,217 | 9/1986 | Iizuka et al. | 347/176 |
| 4,683,479 | 7/1987 | Horiya et al. | 347/188 |
| 4,774,526 | * 9/1988 | Ito | 347/171 |
| 4,782,202 | 11/1988 | Sawae et al. | 219/68 |
| 4,933,686 | * 6/1990 | Izumi et al. | 347/171 |
| 5,233,365 | 8/1993 | Uemura et al. | 347/171 |
| 5,343,227 | 8/1994 | Hirosawa et al. | 347/42 |

FOREIGN PATENT DOCUMENTS

| | | |
|---|---|---|
| 63-295270 | 12/1988 | (JP) . |
| 4-158049 | 6/1992 | (JP) . |

* cited by examiner

*Primary Examiner*—N. Le
*Assistant Examiner*—Anh T. N. Vo
(74) *Attorney, Agent, or Firm*—Perkins Coie LLP

(57) ABSTRACT

A printhead having multiple print lines of conventional design and a printhead control system for using the multiple print lines in a variety of operations. In one embodiment, the printhead control system prints an image by superimposing the printing from multiple print lines. In another embodiment, the image is printed by alternating the energization of one print line so that each print line is used to print only ⅓ of the image lines. As a result, the print lines are allowed a relatively long time to cool, thus allowing the printhead to be operated at a faster speed. In another embodiment, the printing elements of each print line print with a different image density, and images printed by superimposing the printing elements in the print lines with a variety of combinations depending upon the desired magnitude of the image density. In still another embodiment of the printhead control system, the resistance of each printing element is checked and, if found to be unacceptably high, corresponding printing elements of other print lines are used for printing.

17 Claims, 14 Drawing Sheets

MEMORY ADDRESS = STARTING COLUMN + N

| WHERE N = | 1 | 2 | 3 | 4 | 5 | 6 | 7 | 8 | 9 |
|---|---|---|---|---|---|---|---|---|---|
| | 0 | 1 | 1 | 1 | 1 | 1 | 1 | 0 | 0 | 0 |
| | 0 | 1 | 1 | 1 | 1 | 1 | 1 | 0 | 0 | 0 |
| | 0 | 1 | 1 | 0 | 0 | 0 | 0 | 0 | 0 | 0 |
| | 0 | 1 | 1 | 0 | 0 | 0 | 0 | 0 | 0 | 0 |
| | 0 | 1 | 1 | 1 | 1 | 1 | 1 | 0 | 0 | 0 |
| | 0 | 1 | 1 | 1 | 1 | 1 | 1 | 0 | 0 | 0 |
| | 0 | 1 | 1 | 0 | 0 | 0 | 0 | 0 | 0 | 0 |
| | 0 | 1 | 1 | 0 | 0 | 0 | 0 | 0 | 0 | 0 |
| | 0 | 1 | 1 | 1 | 1 | 1 | 1 | 0 | 0 | 0 |
| | 0 | 1 | 1 | 1 | 1 | 1 | 1 | 0 | 0 | 0 |

*Fig. 5*

PRINTHEAD HAVING MULTIPLE PRINT LINES, AND METHOD AND APPARATUS FOR USING SAME

CROSS-REFERENCE TO RELATED APPLICATION

This application is a continuation of U.S. patent application Ser. No. 08/869,804, filed Jun. 4, 1997, now U.S. Pat. No. 6,025,861; which is a divisional of U.S. patent application Ser. No. 08/156,266, filed Nov. 22, 1993, issued as U.S. Pat. No. 5,675,370.

TECHNICAL FIELD

This invention relates to thermal printers, and more particularly, to a method and apparatus for improving the printing quality, speed, and capabilities of such printers.

BACKGROUND OF THE INVENTION

Thermal printers are commonly used to print alphanumeric characters and bar codes on a variety of printing media such as paper, label stock, tubing, etc. Thermal printers utilize a thermal printhead having a line of thermal printing elements, each of which may be selectively heated. As each printing element is heated, appropriate markings are applied to the printing media, either directly or through a meltable transfer medium.

The thermal printheads used in thermal printers generally include both mechanical components containing the printing elements and associated electrical circuitry applying heating signals to the printing elements. The mechanical printhead is generally formed by a fairly thick substrate of aluminum or some other material that conducts heat readily. A ceramic insulating layer having a high thermal conductivity is then formed on the upper surface of the aluminum. The insulating layer preferably not only conducts heat well, but it also has a relatively low heat capacity so that it does not itself retain heat transferred to the substrate. A relatively thin underglaze layer coats the insulating layer, and a metallic pattern is then placed on top of the underglaze layer to form the conductors for the printing elements. The conductive pattern may include an elongated anode conductor extending along the length of the printhead, and a plurality of spaced-apart finger conductors projecting perpendicularly from the elongated anode. Individual conductive leads are interleaved with the finger conductors. A bar of resistive material overlies the finger conductors and individual leads so that current will flow through the resistive material from a finger conductor to any individual lead that is connected to ground. Thus, a "dot" of resistive material can be heated by simply grounding an individual lead positioned between two finger conductors. The length of the dot corresponds to the distance between adjacent finger conductors. An electrically insulative but thermally conductive overglaze is then placed over the resistive material and conductors.

The above-described structure is used for a thick film printhead. A thin film printhead has substantially the same structure except that the individual leads are generally positioned adjacent a projecting finger conductor rather than between two finger conductors. A resistive sheet overlies the finger conductors and individual leads so that localized "dots" of the resistive sheet may be heated by selectively grounding the individual leads.

The electrical components of the printhead generally include a set of registers which receive a serial data stream of data bits corresponding in number to the number of printing elements. The registers retain the data bits and ground the individual leads corresponding to the registers that store a logical "1". However, the data output by each register is generally ANDed with a strobe signal to precisely control the timing and duration of the grounding of the individual leads.

One important limitation on the operating capability of thermal printers is their printing speed. The printing speed of a thermal printhead is limited by the time required to heat a printing element to an appropriate temperature in order to form a mark on a printing medium, as well as the time required for the printing element to cool so that a mark is not formed on the printing medium when no mark is desired. The time required to heat the printing element is a function of the current flowing through the resistive bar or sheet between conductors. The time required for a printing element to cool is a function of the thermal conductivity from the printing element to the substrate. While the print speed can be improved by using thin film printhead technology having a lower thermal mass, it would nevertheless be desirable to increase the speed of thermal printers.

Another problem with conventional thermal printers is that they lack the capability to perform various printing functions that are available with other types of printers. For example, thermal printers generally are incapable of performing high quality "gray scale" printing. For this reason, the use of thermal printers has generally been limited to printing alphanumeric letters, bar codes, and the like. Similarly, the resolution of conventional thermal printers is generally set at a fixed value, such as 150 dots per inch ("DPI"), and this fixed resolution cannot be varied without changing the printhead. However, different types of printing needs often require different printing resolutions. It would therefore be desirable to have a thermal printer that could provide the relatively high speed and low data requirement capabilities of a low resolution printhead yet also be able to provide the high quality printing capabilities of a high resolution printhead.

Another limitation of conventional thermal printers is their inability to alter the shape or aspect ratio of their printing elements. As explained above, the shape of the printing element is determined by the physical structure and geometry of the conductive pattern and overlying resistive layer. While different printing element shapes and aspect ratios can be achieved with different physical designs, the shape and aspect ratio of the printing element is nevertheless fixed for any particular design.

Another problem that sometimes occurs with conventional thermal printers results from changes in the resistivity of the resistive coating either with age or as a result of a malfunction. If the resistivity of some printing elements changes more than the resistivity of other printing elements, then the image formed on the printing medium will not have a uniform print density. If the resistance increases significantly, the printing element may even become unusable.

While thermal printers have found common acceptance, the above-described problems have nevertheless limited their usefulness for certain printing needs where optimum print quality, speed, and/or capabilities are required.

SUMMARY OF THE INVENTION

It is an object of the invention to provide a thermal printer that is capable of significantly higher speeds than conventional thermal printers.

It is another object of the invention to provide a thermal printer that has advanced capabilities, such as the capability of performing gray scale printing and variable resolution printing.

It is still another object of the invention to provide a thermal printer that can operate in an optimum manner despite degradations in the components of the thermal printhead with age and malfunction.

These and other objects of the invention are provided by a printhead having a plurality of spaced apart parallel print lines, each of which include a plurality of sequentially positioned printing elements that are selectively heated. The thermal printhead is preferably formed by a unitary printhead substrate having a plurality of discrete, separately energizable, parallel print lines spaced apart from each other by a predetermined distance. The printhead may further include means for selectively applying respective heating signals to each printing element in the print lines so that the print lines can print independently of each other on a common print media passing over the printhead from one print line to the next.

The printhead is connected to a printhead controller that receives data corresponding to an image to be printed on the print media. The printhead controller then selectively applies heating signals to the printing element in each of the print lines to thermally print a line of the image on the printing media. The printhead controller also preferably includes an image memory containing printhead data corresponding to the heating signals. The data is preferably stored in the memory in an order corresponding to the order that the heating signals are applied to the printhead. The printhead data may be stored in the memory in an N×M matrix where N is a number of scan line columns corresponding to the number of scan lines needed for the printhead to print the image on the print media, and M is a number of printing element rows corresponding to the number of printing elements in each print line of the printhead. In one embodiment of the invention, each line of the image is printed by superimposing the printing from all of the print lines. In another embodiment, each line of the image is printed by superimposing the printing from different combinations of print lines to produce an image having a variable image density. In this other embodiment, each of the print lines preferably prints with a different print density. In still another embodiment, each line of the image is printed by a single print line in a time-staggered sequence so that each print line has a relatively small duty cycle, thus increasing the printing speed of the printhead. The printhead controller may also include means for determining the resistance of the printing elements of each line of the printhead. The controller then applies a heating signal to one printing element in each set of correspondingly positioned printing elements as a function of the resistance of the printing elements in the set. As a result, when a heating element of a print line is found to be defective, correspondingly positioned printing elements in other print lines may be used.

BRIEF DESCRIPTION OF THE DRAWINGS

FIG. 5 is a memory map showing the data stored in an image memory used in the printhead control unit of FIG. 2 to print the image shown in FIG. 3.

DETAILED DESCRIPTION OF THE INVENTION

Figure 1:
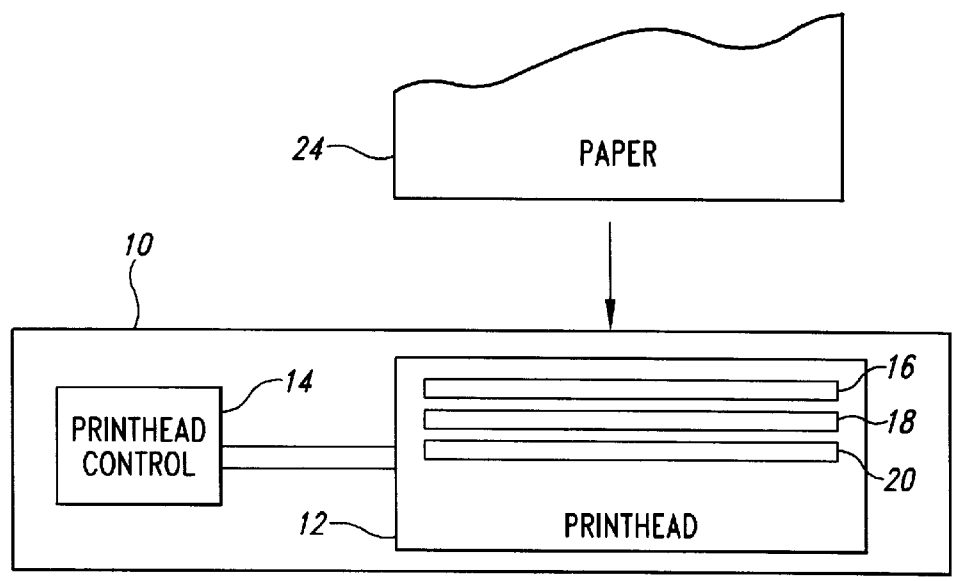
FIG. 1 is a schematic block diagram of a preferred embodiment of the inventive thermal printer.

A preferred embodiment of the inventive printer is illustrated in FIG. 1. The printer 10 includes a printhead 12 connected to a printhead control unit 14. The printhead 12 utilizes a conventional substrate, such as aluminum, and it is preferably covered with a single layer of insulative material, although separate, discrete areas of insulated material may be used. The insulative material is also preferably covered by an underglaze material (not shown) of conventional design. Where the inventive printhead 12 departs from conventional design is in the use of multiple lines 16, 18, 20 of printing elements rather than a single line of printing elements as in conventional designs. Each line 16–20 of printing elements is formed in a conventional manner with selectively grounded individual leads positioned adjacent or between common anode finger conductors, and each line of conductors is coated with a bar or layer of resistive material which is then covered with a protective overglaze. Although the printhead 12 is shown in FIG. 1 as having three printhead lines 16–20, it will be understood that any number of multiple printhead lines (i.e., two or more) may be used.

The printhead control unit 14 provides a serial stream of data bits to the printhead 12 for each print line 16–20, with the number of bits in the bit stream corresponding to the number of printing elements in each line 16–20. The bits determine whether the corresponding printing element is energized or not energized during each scan line.

In operation, a sheet of print media 24, such as paper, passes over the printhead 12 in the direction of the arrow with the surface of the print media 24 in contact with the printhead lines 16–20. As explained in greater detail below, the printing elements in each of the lines 16–20 are selectively heated to create an image on the print media 24, either directly or through a thermal transfer medium (not shown).

Figure 2:
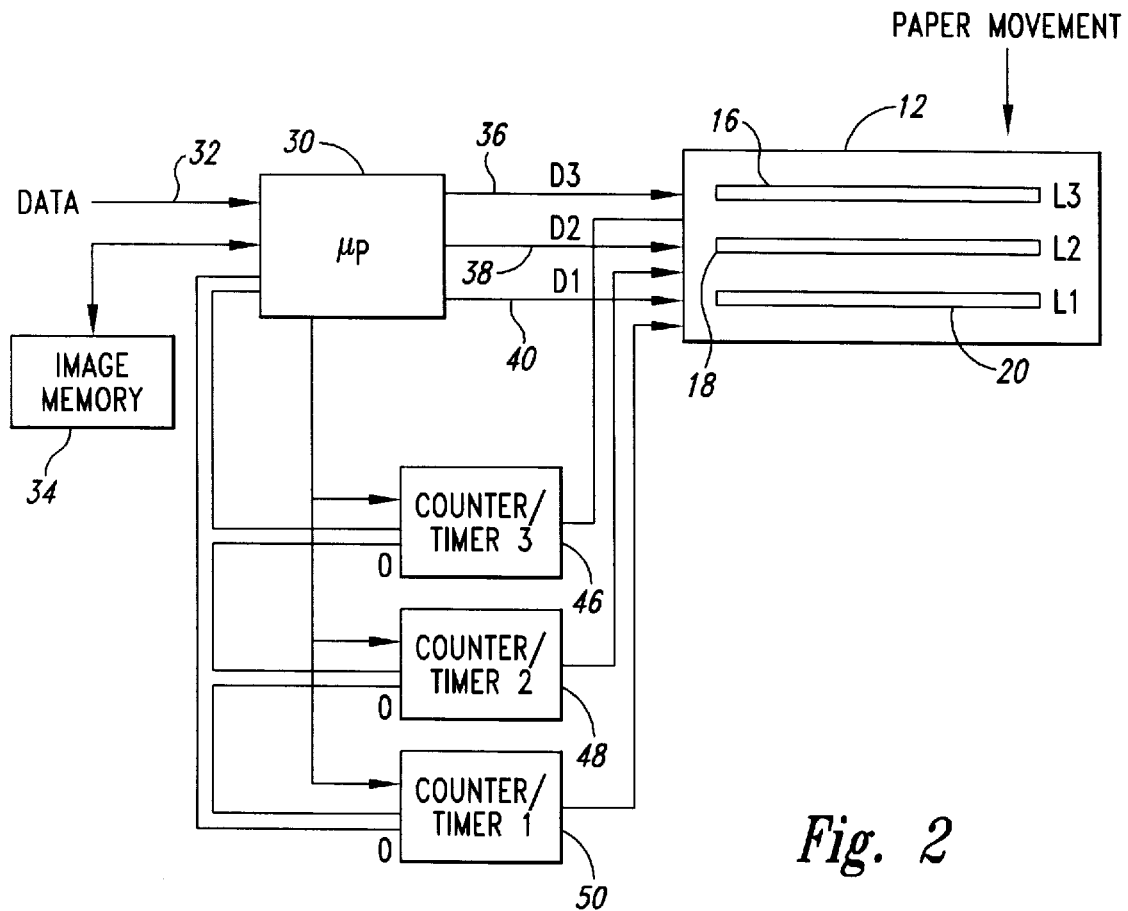
FIG. 2 is a block diagram of one embodiment of the printhead control unit used in the preferred embodiment of FIG. 1.

One embodiment of a printhead control unit 14 is illustrated in FIG. 2. The printhead control unit 14 includes a microprocessor 30 of conventional design which receives alphanumeric or bar code data, for example, from an external unit (not shown) via an input bus 32. The microprocessor determines which printing elements of each printhead line 16–20 should be energized during each scan line to produce an image corresponding to the data input via bus 32. The bits indicative of the energization state of each printing element are then stored in an image memory 34, which may be a conventional random access memory. The microprocessor 30 selectively reads the image data from image memory 34 and applies it to the printhead 12 via serial data lines 36, 38, 40 corresponding to printhead lines 16, 18, 20. As is well known in the art, the printing elements in lines 16–20 are not immediately heated when the microprocessor 30 applies the data to the printhead 12. Instead, the heating elements are energized only during a strobe signal. Strobe signals for each of the printhead lines 16–20 are generated by respective counter/timers 46, 48, 50 which are, in turn, programmed by the microprocessor 30 in a conventional manner.

In operation, data indicative of whether each printing element of each line 16–20 is to be heated during a scan line is transferred from the microprocessor 30 to the printhead 12, as explained above. The counter/timers 46–50 are then programmed by the microprocessor 30 to produce a predetermined strobe signal. The microprocessor 30 then applies a trigger signal to the counter/timers 46–50. The counter/timer 46 generates a strobe signal for the printhead line 16, the counter/timer 48 generates a strobe signal for the printhead line 18, and the counter/timer 50 generates a strobe signal for the printhead line 20. The manner in which the printing elements for each printhead line 16–20 are heated in various operating modes is explained below.

Figure 3:
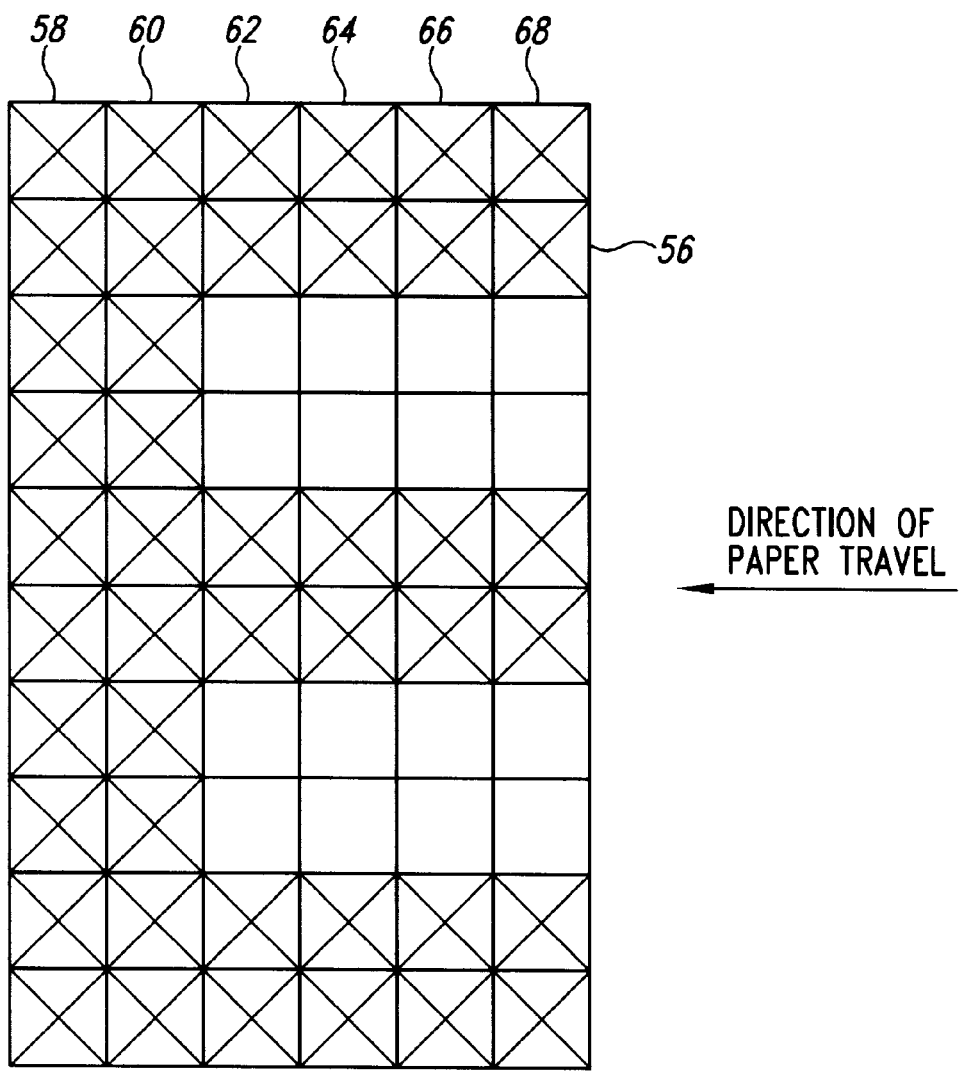
FIG. 3 is illustration of an image printed by the thermal printer of FIG. 1.

As mentioned above, the inventive thermal printer can be used to print virtually any type of image, including alphanumeric characters and bar codes. One alphanumeric character that can be printed by the inventive thermal printer (the letter "E") is illustrated in FIG. 3. The image shown in FIG. 3 is composed of 60 pixels, shown generally at 56, in a 6×10 pixel array. The pixels marked with an "X" are pixels that have been thermally marked, while pixels without an "X" are pixels that have not been thermally marked. Since the print media is moving from right to left, the leftmost column of pixels 58 reaches the printhead 12 first while the rightmost column of pixels 68 reaches the printhead 12 last.

Figure 4:
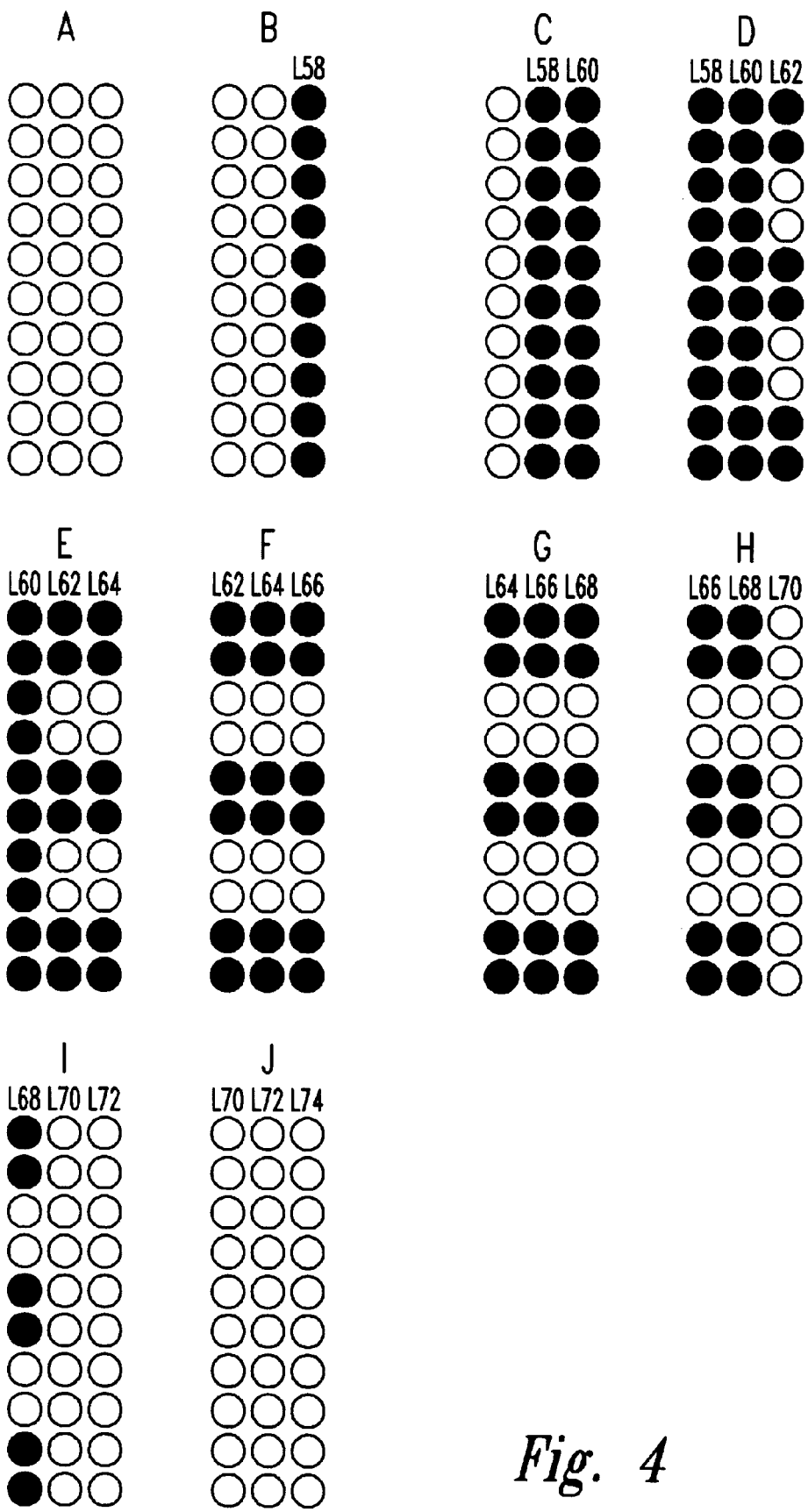
FIG. 4 is a diagram showing the manner in which the printing elements used in the thermal printer of FIG. I are heated during each of several scan lines to print the image shown in FIG. 3 using all three printhead lines to print each line of the printed image.

In one operating mode of the inventive thermal printer, each printhead line 16–20 contributes to the printing of each line of image 58–68. In other words, printhead line 16 first marks the pixels on image line 58 to a slight degree, the marking of the image line 58 is increased by heat from the second printhead line 18, and the image line 58 is darkened to its final image density by heat from the third printhead line 20. A diagram showing the heating condition of each of ten printing elements in each printhead line 16–20 for ten different scan lines is illustrated in FIG. 4. As shown in FIG. 4A, the first image line 58 has not yet reached the first printhead line 16. As a result, none of the printing elements in the printhead 12 are being heated. When the first image line 58 reaches the first printhead line 16, all ten of the printing elements of line 16 are heated, as illustrated in FIG. 4B. The print media is then incrementally stepped so that the first image line 58 is adjacent the second printhead line 18, as illustrated in FIG. 4C. In this position, the second printhead line 18 further increases the image density of the first image line 58, while the first printhead line 16 initially marks the second image line 60 (FIG. 2). As shown in FIG. 4D, the first image line 58 has reached the third printhead line 20. In this position, the first image line 58 is marked by printhead line 20 to its final image density, image line 60 is further marked by printhead line 18, and the third image line 62 is initially marked by the first printhead line 16. Note that four of the printhead elements of the first printhead line 16 are not heated during the scan line shown in FIG. 4D, thereby forming the initial portion of the openings between the arms of the "E".

The printing media 24 is sequentially incremented past the printhead as shown in FIGS. 4E, F and G until it has stepped to the position shown in FIG. 4H. In this position, the last image line 68 is being printed by the second printhead line 18 while the second to last image line 66 is being printed by the third printhead line 20. As shown in FIG. 4I, the last image line 68 is being printed by the third printhead line 20. Finally, the image shown in FIG. 3 has passed entirely beyond the printhead as shown in FIG. 4J.

With reference to FIG. 5, the manner in which data are stored in the image memory 34 (FIG. 2) to allow the printhead control unit 14 to operate as shown in FIG. 4 is illustrated in FIG. 5. The image memory 34 can be visualized as a 10×6 bit array of data corresponding to the 6×10 pixel array forming the image of FIG. 3. In practice, the data can be stored in the image memory 34 in any order as long as it is transferred by the microprocessor 30 to the printhead 12 in the manner shown in FIG. 5. Each column of data stored in the image memory has an address corresponding to an arbitrary starting column address and a column address increment which, as shown in FIG. 5, ranges between zero and seven. When N is equal to zero, the memory address is equal to the address of the starting column. The data bytes in column zero are transferred in serial to the printhead 12 to cause the first printhead line 16 to be heated as shown in FIG. 4B. During the next scan line, the column increment N is incremented to 1 so that the data shown in column 1 are transferred to the first printhead line 16. At the same time, the data in column 0 are transferred to the second printhead line 18. During the next scan line, the data stored in column 0 are transferred to printhead line 30, the data stored in column 1 are transferred to printhead line 18, and the data stored in column 2 are transferred to printhead line 16. In this same manner, the serial bytes of data stored in each column of the image memory 34 as shown in FIG. 5 are transferred to the printhead lines 16–20.

Figure 6:
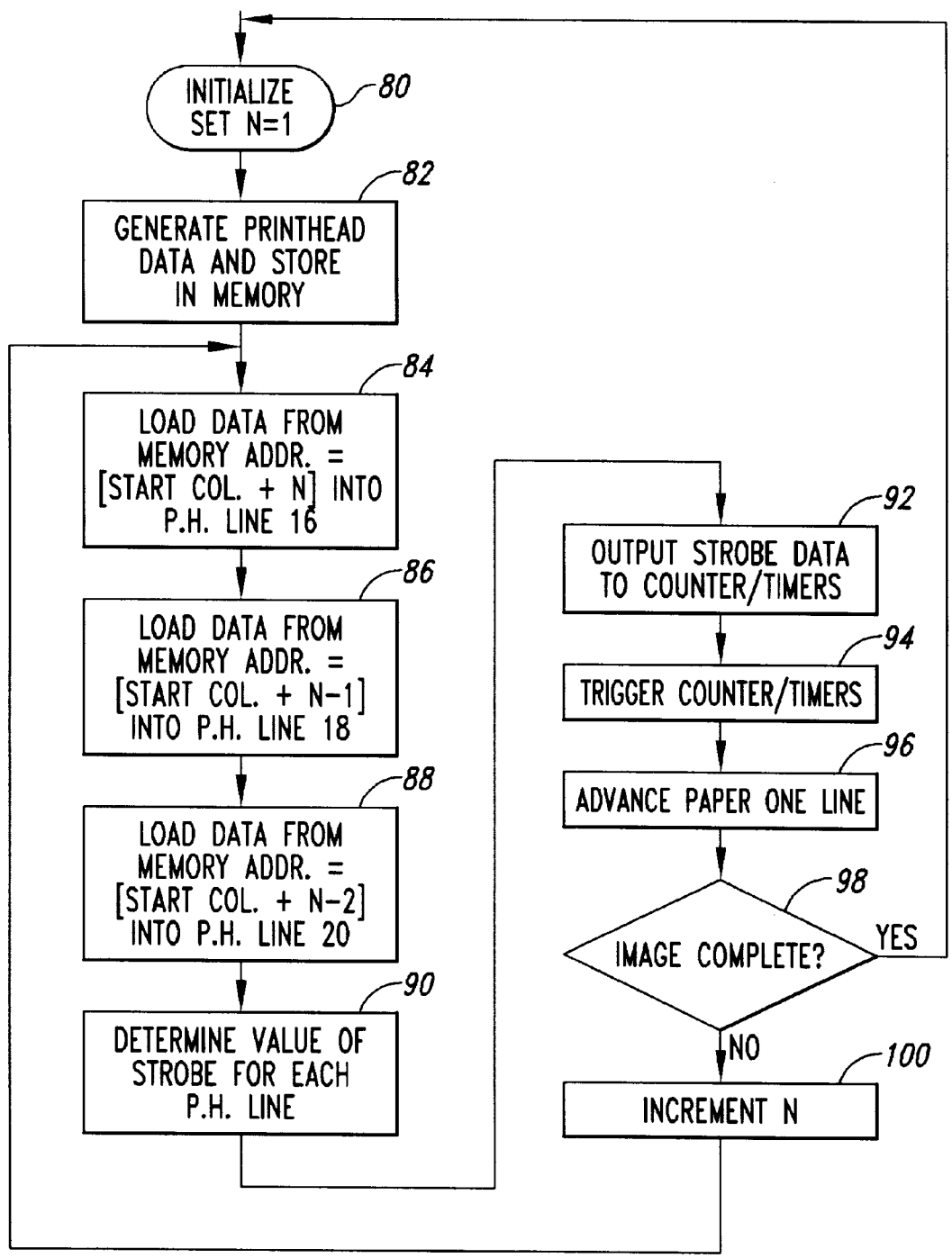
FIG. 6 is a flow chart showing the software that is executed by a processor used in the printhead control unit of FIG. 2 to print the image shown in FIG. 3 using all print printhead lines for each pixel of the printed image.

One embodiment of software for controlling the operation of the microprocessor 30 to operate as explained above is illustrated in FIG. 6. The program initializes the microprocessor 30 at step 80. During this initialization step 80, various registers and counters in the microprocessor 30, including a scan line counter N are reset or cleared. At step 82, the microprocessor 30 generates the printhead data (such as the data shown in FIG. 5) corresponding to the image data input via bus 32, and stores the printhead data in the image memory 34. The program then progresses to step 84 where the microprocessor 30 loads data from an address corresponding to the sum of the starting column and the scan line counter N into line 16 of the printhead. In the example illustrated in FIG. 5, the data byte "111111111" is loaded into the printhead line 16. The program then progresses to step 86 where the microprocessor 30 loads data from the next lower column of image memory into printhead line 18. In the above example, the data in this column are all zero. Finally, at step 88 the microprocessor 30 loads data from the second to next lowest column of image memory into printhead line 20. In the example above, this data would be all zero's, although it is not shown in the image memory map.

After the printhead 12 has been loaded data for each printhead line 16–20, the microprocessor 30 determines a value of strobe for each printhead line at step 90. The microprocessor then outputs the strobe data to the counter/timers 46–50 at step 92. The actual printing by the printhead line 16–20 occurs at step 94 when the microprocessor 30 applies the trigger signal to the counter/timers 46–50. The microprocessor 30 then generates a paper advance pulse via line 33 to a conventional external paper control device at step 96 (not shown). The program then checks at step 98 to determine if the final image line has been printed. If not, the internal scan line counter N is incremented at 100, and the program returns to step 84. Since N is now equal to two, data from the second image memory column are loaded into printhead line 16 at step 84, data from image memory column one are loaded into printhead line 18 at step 86, and data from image memory column zero are loaded into printhead line 20 at step 88. The program then causes strobe signals to be generated as explained below, advances the paper an additional image line and once again increments the scan line counter N at 100. This time, since N is equal to three, the third column of image memory is loaded into printhead line 16 at step 84, the data in the second column of image memory are loaded into the second printhead line 18 at step 86, and the data in the first image memory column are loaded into printhead line 20. In the same manner, the program sequentially step through 84–100 until N has been incremented to eight. Data stored in the eighth image memory column are then loaded into printhead line 16, data in image memory column line 7 are then loaded into printhead line 18, and data stored in image memory column 6 are loaded into printhead line 20. In this scan line, the final printing of the image shown in FIG. 3 is performed by the third printhead line, and the printing of the image is now complete. Thus, when the program checks at step 98 to determine if the image is complete, the program will now branch back to step 80 where the scan line counter N is reset to "1". Printing then resumes with receipt of the next image data via line 32.

Figure 7:
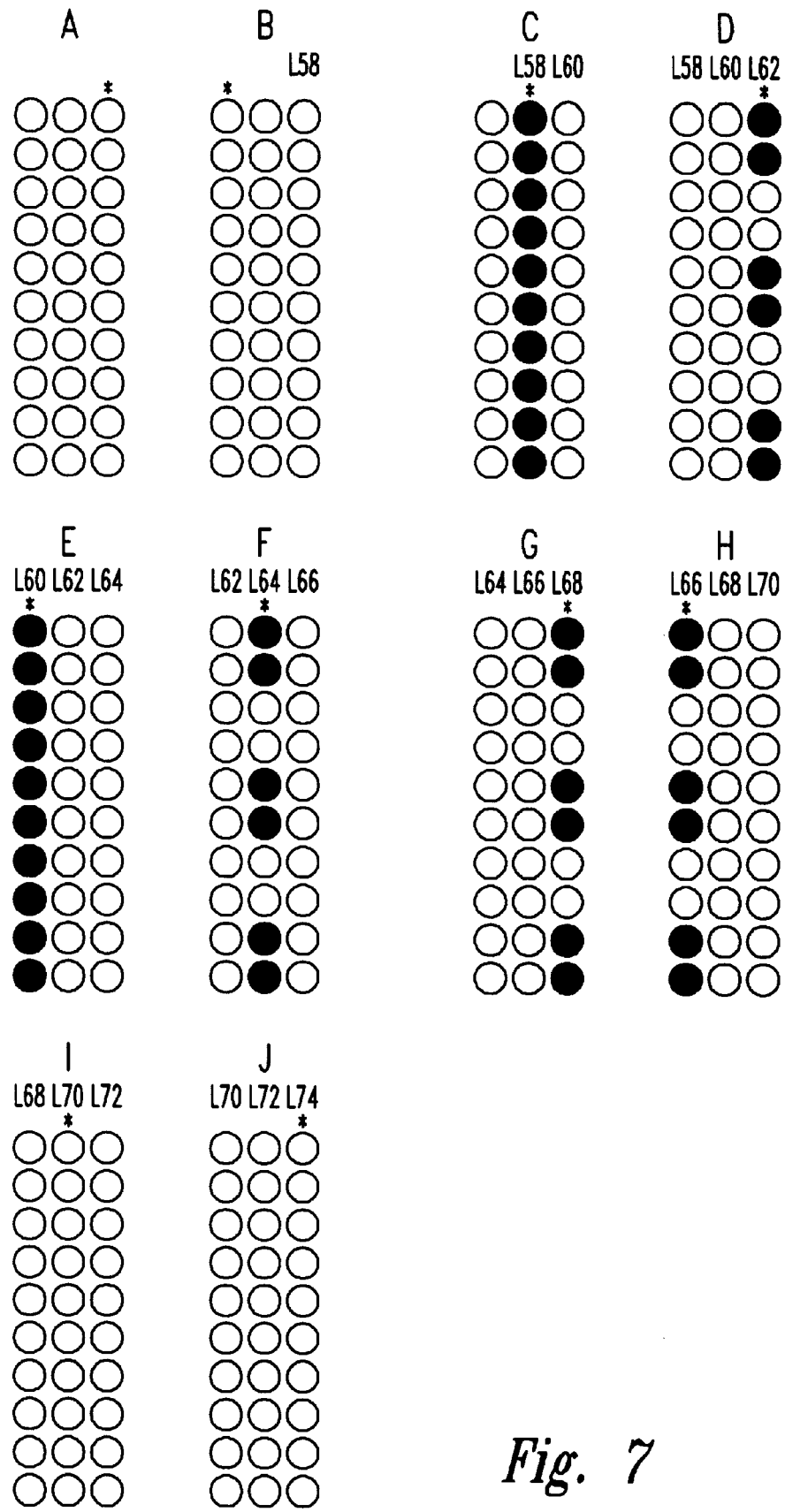
FIG. 7 is a diagram showing the manner in which the printing elements used in the thermal printer of FIG. 1 are heated during each of several scan lines to print the image shown in FIG. 3 using one printhead line to print each line of the printed image.

As an alternative to using all three printhead lines 16–18 to print each image line, the inventive printer may also be used to print each image line using a single printhead line 16–20, but energizing only one printhead line at a time in a predetermined sequence. The advantage of this operating mode is that the duty cycle of each printhead line 16–20 is 33% so that the printhead line 16–20 is allowed to cool for at least approximately two-thirds of the time. These relatively long cooling time allows the printhead 12 to operate at a relatively high speed, thus allowing the inventive printer to print significantly faster than conventional thermal printers. With reference to FIG. 7, the heating of each of ten printing elements of the printhead line 16–20 are illustrated in FIGS. 7A–J in the same manner as in FIGS. 4A–J. However, the diagram of FIGS. 7A–J have been further marked with an asterisk ("*") to designate the printhead line that is currently active. Thus, in FIG. 7A, printhead line 16 is active, although the first image line has not reached the printhead line 16 so that none of the printing elements of line 16 are energized. The next printhead line that is energized is line 20 as illustrated in FIG. 7B. However, in this position the first image line has only reached the first printhead line 16, so that none of the printing elements of line 20 are energized. Further, since printhead line 16 is not active, none of the printing elements of line 16 are energized, even though the first image line has reached the printhead line 16. In FIG. 7C, printhead line 18 is active, and, in this position, the first image line 58 (FIG. 3) has reached printhead line 18 so that all of its printing elements are energized. The energization sequence of printhead lines 16, 20, 18 shown in FIGS. 7A–C, respectively, then begins anew at FIG. 7D. In this position, the third image line 62 has reached the active printhead line 16 so that the printing elements of line 16 are heated as illustrated in FIG. 7D. In FIG. 7E, the second image line 60 is printed by the active third printhead line 20. In the third scan line of the sequence illustrated in FIG. 7F, the fourth image memory line 64 is printed by the active second printhead line 18. The above-described operation continues through FIG. 7G where the final image line 68 is printed by the first printhead line 16 and FIG. 7H where the image line 66 is printed by the third printhead line 20.

Figure 8:
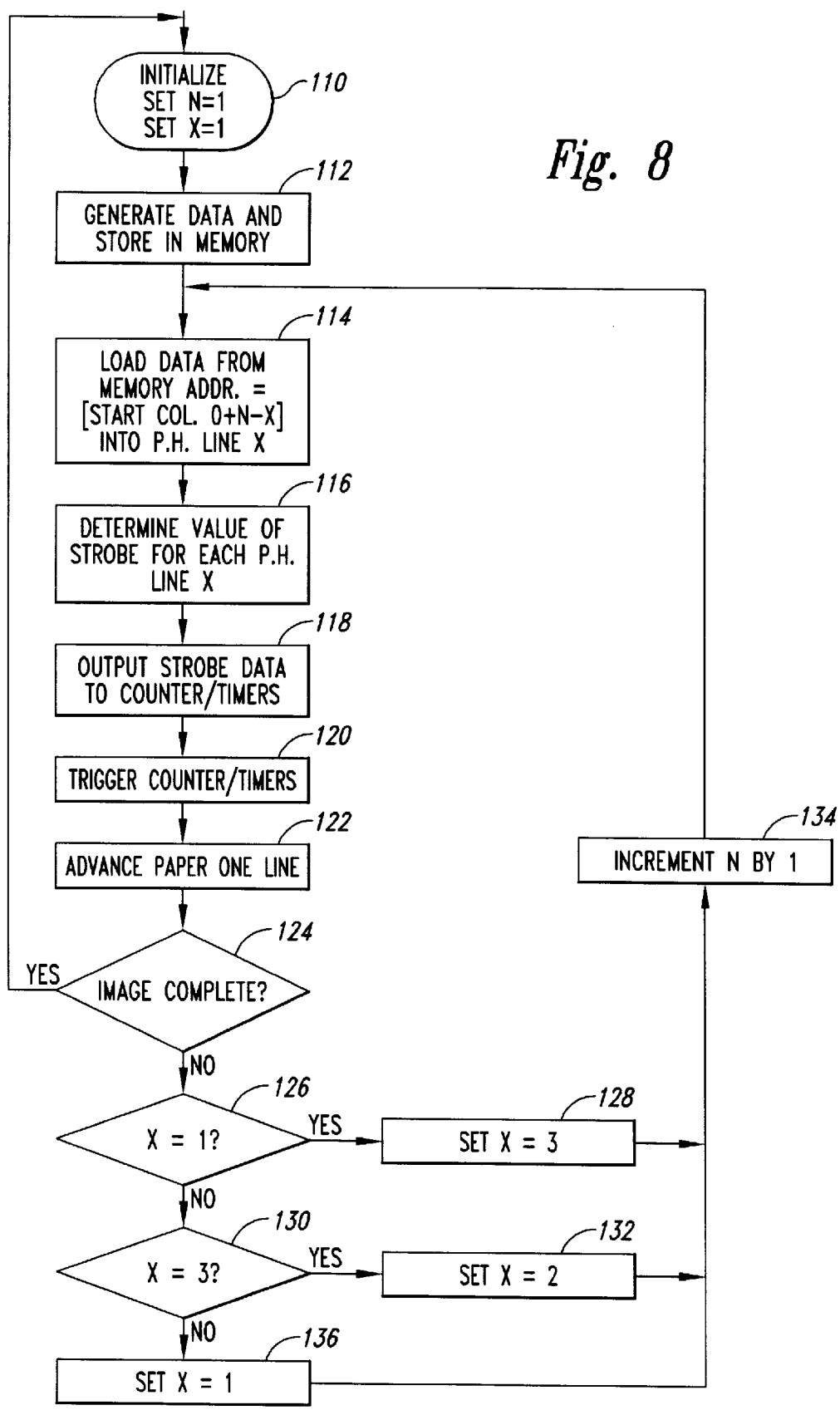
FIG. 8 is a flow chart showing the software that is executed by a processor used in the printhead control unit of FIG. 2 to print the image shown in FIG. 3 using one printhead line to print each line of the printed image.

A flow chart for causing the microprocessor 30 (FIG. 2) to operate as shown in FIG. 7 is illustrated in FIG. 8. As with the flow chart of FIG. 6, the program is entered at an initialization step 110 during which a scan line counter N is reset to 1 and a printhead line counter X is also reset to 1. The program then causes the microprocessor to generate the printhead data from the image data input via bus 32 and store the printhead data in the image memory 34 at step 112 in the same manner as in step 82 of FIG. 6. The program then progresses to 114 where data is loaded from a memory address designated by the sum of the starting column, N and X into printhead line X. Since N and X are both equal to 1 during the first pass through 114, the data is loaded from the starting column into printhead line 1 corresponding to printhead line 16. At 116, the program determines a value of strobe for printhead line X (where X=1) and outputs that data to the counter/timers 46–50 at 118. At 120, the microprocessor 30 triggers the counter/timers 46–50, thereby causing printhead line X (where X=1 for the first pass through 114–120) to print an image on the printing media. The microprocessor 30 then generates a paper advance pulse on line 33 at step 122 and checks to determine if the image is complete at line 124. During the initial pass through the software, the image will not be complete so that the program will check at lines 126 to determine if the print line counter X is equal to 1. During the first pass through the program, X will be equal to 1 so that the program will branch to 128 to set the printhead counter X=3. The program then increments N by 1 at 134 and returns to step 114 where data from image memory address column –1 (since X=3 and N=2) is loaded into printhead line 3, which corresponds to line 20, as shown in FIG. 2. The microprocessor 30 then causes line 20 to print in steps 116–120 and advance the paper at step 122 before progressing to 126. At 126, the program branches to 130 since X was previously set to 3 at step 128. For this reason, the program will now branch to step 132 to set the program line counter equal to 2 before increment N by 1 at 132 and returning to step 114. At 114, the program loads data from memory address column 1 (since X=2 and N=3) into printhead line 2, which corresponds to printhead line 18 in FIG. 2. The microprocessor 30 once again causes the printhead line 18 to print in advance of the paper one line before progressing through 126 to 130. Since X is now equal to 2, the program will branch to 136 and reset X=1 then N is incremented at 134, and the program branches back to 114. At this time, data from memory location 3 (since N=4 and X=1) is loaded into printhead line 1 corresponding to printhead line 16 in FIG. 2. Printhead line 16 is then caused to print at steps 116–120 and the paper is advanced one line at 122. The program then loops as explained above until the program determines at 124 that the image is complete. The program then returns to 110 to await image data for the next image via bus 32.

Figures 9, 10:
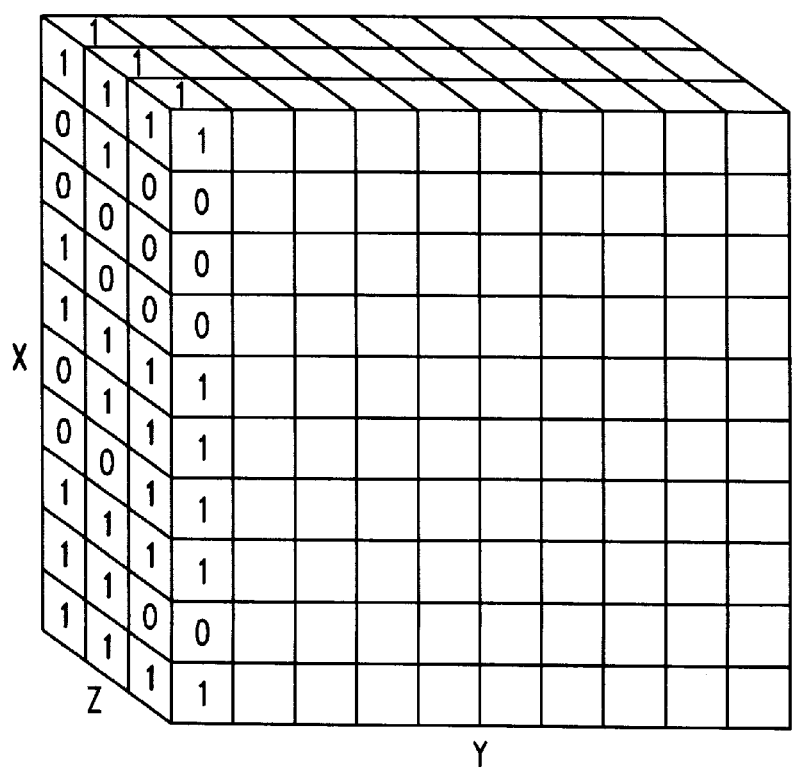
FIG. 9 is a diagram showing a single line of an image having a variable print density printed by the thermal printer of FIG. 1 shown along with the decimal and binary values of the print density of each pixel of the image.
FIG. 10 is a three-dimensional memory map showing the data stored in an image memory used in the printhead control unit of FIG. 2 to print the single line image shown in FIG. 9.

As mentioned above, the inventive thermal printer is capable of variable density printing. With reference FIG. 9, a single line 150 of an image is printed. The line 150 contains 10 pixels, each of which is printed with an image density between 0 and 7 as indicated by the decimal numbers shown to the right of the image line 150. The binary numbers for the optical density are shown in the three columns to the right of the decimal column. The binary printhead data shown in FIG. 9 can be stored in memory as shown in FIG. 10. The printhead data is shown as a three-dimensional array where "X" corresponds to the column of printhead data, "Y" corresponds to each printing element, and the "Z" corresponds to the 3 bits used to determine the density of the printed pixel. However, it will be understood that the data need not be stored as illustrated in FIG. 10, as long as it is loaded into the printhead 12 in the form illustrated in FIG. 10. The inventive thermal printer is able to print with variable image density because the printing elements in each printhead line 16–20 (FIG. 1) print with different image densities. In the example illustrated, the printing elements of printhead line 16 have a relative density of 4, the printing elements of printhead line 18 print with a relative density of 2 and the printing elements of printhead line 20 print with a relative density of 1. Thus, by combining correspondingly positioned printing elements in each of the three printhead lines 16–20, eight different image densities may be printed for each pixel of the image.

Figure 11:
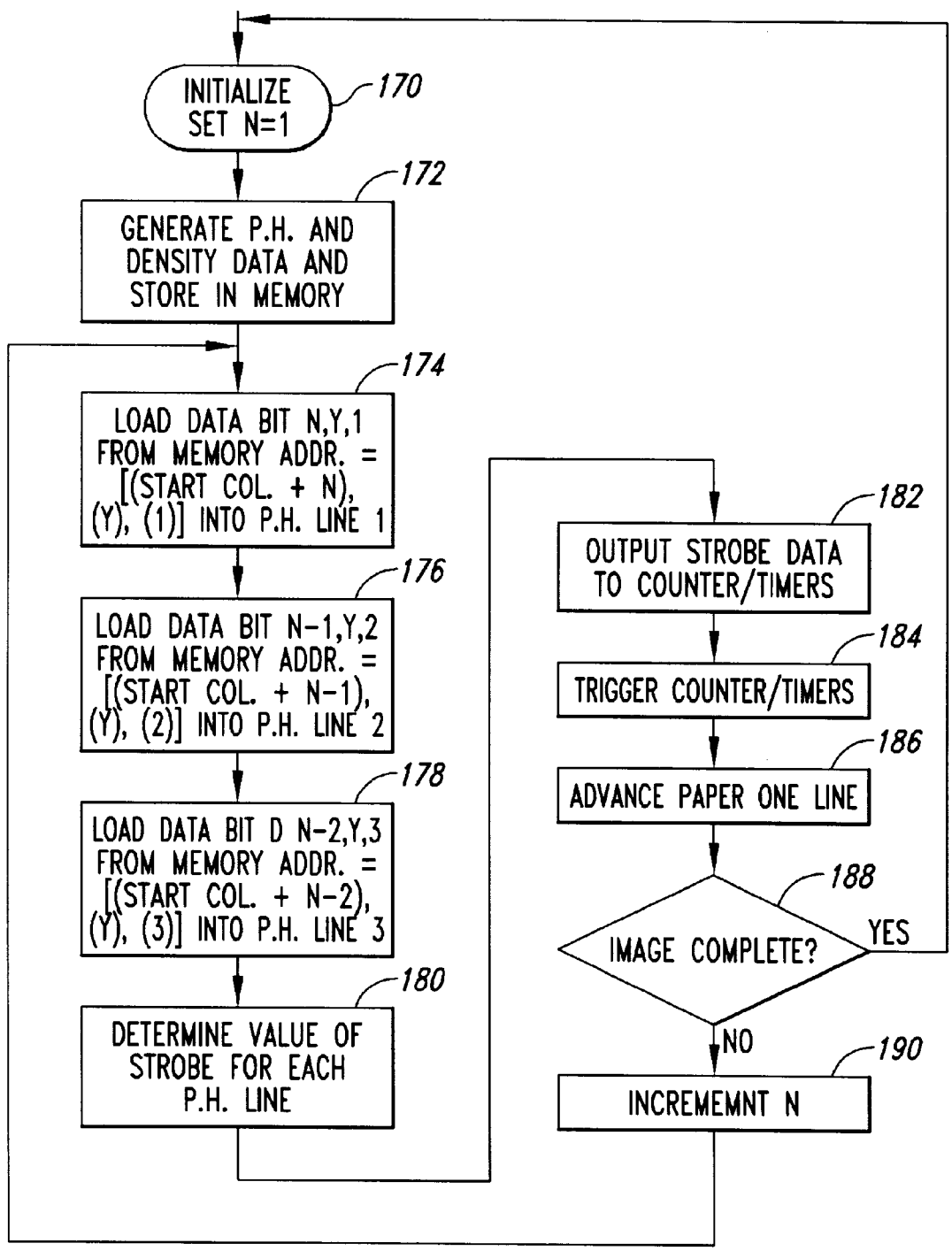
FIG. 11 is a flow chart showing the software that is executed by a processor used in the printhead control unit of FIG. 2 to print the single line image shown in FIG. 9.

A flow chart of software for causing the microprocessor 30 (FIG. 2) to operate as shown in FIG. 9 is illustrated in FIG. 11. As before, the program is entered through an initialization step 170, and the printhead and density data shown in FIG. 10 is stored in the image memory 34 at step 172. At 174, the microprocessor 30 loads data bit $D_{N,Y,1}$ from a memory address column N, row i, and bit 1 into printhead line 1, which corresponds to line 16 of FIG. 2. In the example given, the data "1011110001" would be loaded from memory 134 into printhead line 16. Thus, data corresponding to the most significant bit of the image density is loaded into printhead at line 16. At 176, the data bits from column 0 (which had been reset to zero) are loaded into printhead line 2, which corresponds to printhead line 18 of FIG. 2. Finally, at 178, data from column –2 is loaded into printhead line 3, which corresponds to printhead line 20 of FIG. 2. The microprocessor then determines the value of a strobe signal for each printhead line 16–20 at 180, outputs the strobe data to the counter timers 46–50 at 182 and then triggers the counter timers 46–50 at 184. After generating a paper advance pulse at 186 as described above, the program checks at 188 to determine if the image has been printed. In the first pass through of steps 174–178, only the first printhead line 16 contains data since the image line 150 is then positioned adjacent the printhead line 16. Since the image is not yet complete, the scan line counter is incremented to 1 at 190 before returning to 174. A column of image memory data 2 (which, as illustrated in FIG. 9, is zero) is loaded into printhead line 16 at 174. At 176, printhead data in column 1 (N–1 where N=2) bit 2 is loaded into printhead line 2 which corresponds to printhead line 18 of FIG. 2. In the above example, the data in column 1, bit 2 is "1100110111." Thus, when the program steps through 180–184, printhead line 18 will print the pixels on image line 150 with a relative image density of 2. After the scan line counter 1 is incremented again at 190, the program causes the printhead line 20 to print the pixels of image line 150 with a relative image density of 1 at step 178. At 178, data from column 1 (N –2 where N=3) bit 3 is loaded into printhead line 3, which corresponds to printhead line 20. In the above example, the data in column 1, bit 3, are "1000111101." As mentioned above, this data causes the printhead line 20 to print the pixels of image line 150 with a relative image density of 1. Thus, after the image line 150 has been printed by all three printed lines 16–20, the image density of each printed pixel has density between 0 and 7. After the image has been completely printed, the program branches from 188 back to the initialization step at 170 to await additional image data via bus 32 (FIG. 2).

Figure 12:
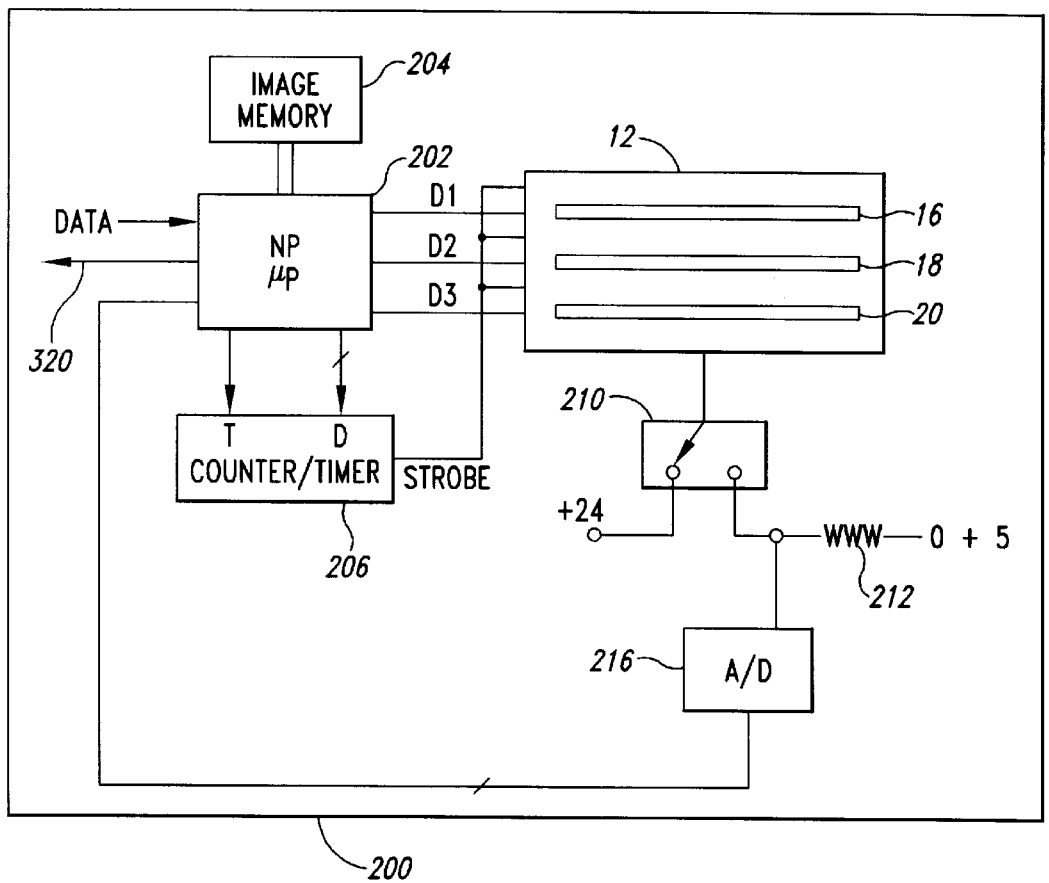
FIG. 12 is a block diagram of another embodiment of the printhead control unit used in the preferred embodiment of FIG. 1 that checks the condition of each printing element in each printhead line, and alters its operation as a function of such check.

Another embodiment of the inventive multiple print line thermal printer is illustrated in FIG. 12. The printer 200 of FIG. 12 is similar to the printer 10 of FIG. 1 except that it includes means for identifying the failure of individual printing elements of a print line and taking corrective action to allow the printer to continue to operate properly despite the failure. With reference to FIG. 12, the printhead 12 is identical to the printhead 12 of FIG. 1, and it is thus then provided with the same reference numerals 16, 18 and 20 to identify the three print lines. The printhead is supplied with data by conventional microprocessor 202 which is connected to an image memory 204 and a counter timer 206 which operate in essentially the same manner as the printhead control system 14 of FIG. 2. However, the printhead control system of FIG. 12 utilizes a switch 210 operated by a control bit from the microprocessor 202 to switch the power terminals of the printhead 12 between either the normally supplied 24 volt source and a 5 volt source supplied to the switch 210 through resistor 212. When the switch 210 connects the printhead to the ±5 volt source, the resistor 212 serves as a current-sensing resistor to generate a voltage that is proportional to the resistance of the printing elements that are energized. By energizing one printing element at a time, the voltage input to the switch across the resistor 212 is proportional to the resistance of the energized printing element. This voltage is read by a conventional analog-to-digital converter 216 which supplies a data byte to the microprocessor 202 indicative of the printing element's resistance.

In operation, the microprocessor 202 sequentially applies a logic "1" through the data lines D1–D3 to each printing element of each print line 16–20 in sequence so that only one printing element is energized at a time. As each printing element is energized, the voltage drop across resistor 212 is measured by the analog-to-digital converter 216. The output of the analog-to-digital converter 216 is then read by the microprocessor 202 so that the microprocessor 202 can determine the resistance of each printing element. The microprocessor 202 then alters the printing operation of the printer in the event that any of the printing elements are found to have an excessively high resistance.

The resistance checking operation can be performed in a variety of manners. For example, the microprocessor can check the resistance of each printing element during an initialization phase prior to starting a printing operation. However, in order to minimize the time required to perform the resistance checking operation, the microprocessor 202 preferably first checks the resistance of each printing element of the first print line 16. If any of the printing elements in print line 16 are found to have an excessively high resistance, then the microprocessor 202 checks the resistance of the corresponding printing element in print line 18. If any of those printing elements in print line 18 have an excessively high resistance, then the microprocessor 202 checks the corresponding printing elements in print line 20. Using this approach, the microprocessor 202 checks all of the printing elements of print line 16, and only checks the printing elements of print lines 18 and 20 if needed because of an excessively high resistance of a printing element in an earlier check print line.

A flow chart of the software for controlling the resistance checking and printing operations of the microprocessor 202 is illustrated in FIG. 13. The program is entered at 230 in an initialization step in which various internal registers, counters and flags are cleared. At 232, the microprocessor 202 causes the switch 210 to connect the ±5 volt current sensing voltage to the power input of the printhead 12, as explained above. At 234, the microprocessor 202 programs the counter/timer 206 so that it will generate a predetermined strobe signal when triggered. The microprocessor 202 then loads printing element N of the first printhead 16 with a test bit at 240. As explained above, the microprocessor 202 loads all but the N printing element with a logic "0", and it loads printing element N with a logic "1". The strobe signal is generated at 242 when the microprocessor 202 triggers the counter/timer 206. As explained above, current then flows through the resistor 212 in proportion to the resistance of the N printing element of line 16, and this resistance is read at 242 when the microprocessor 202 samples the output of the analog-to-digital converter. The microprocessor then checks at 242 to determine if the resistance of printing element N is larger than a predetermined value $R_{MAX}$. $R_{MAX}$ is a resistance value which serves as the dividing line between a printing element considered to have an acceptable resistance and a printing element considered to have an excessively high resistance. If the resistance of printing element N is not excessively high, the program sets a flag at 244 to provide an indication that printing element N of printhead 16 has an acceptably low resistance for use in a subsequent printing operation. If the resistance of printing element N is excessively high, the program bypasses step 244 so that no flag is set for printing element N of printhead 16. Regardless of whether a flag is set for printing element N of printhead 16, the program checks at 250 to determine if N has been incremented to $N_{MAX}$. $N_{MAX}$ corresponds to the number of printing elements in printhead 16. During the initial pass through steps 230–244, N will be less than $N_{MAX}$ so that the program will branch from 250 to 252 in order to increment N by 1 and will then return to 240 to perform a resistance test on the next printing element of printhead 16, as described above. When all of the printing elements of print line 16 have been checked, N will be equal to $N_{MAX}$, thereby causing the program to branch from 250 to 254 where the printing element index N is reset to 1. At this stage, all of the printing elements of print line 16 have been checked.

The program then proceeds to 260 to check the resistance of printing elements of the remaining print lines 18 and 20 if the corresponding element of print line 16 has not been flagged. At 260, the program determines if printing element 1 (N having been reset to 1 at 254) of print line 16 has been flagged. If not, the corresponding printing element of print line 18 is checked by first loading printing element N of print line 18 with a test bit at 262. This step is performed in the same manner as described above with reference to step 240 except that it is performed on print line 18 instead of print line 16. The microprocessor 202 then triggers the counter/timer 206 at 264 in the same manner as at step 240. The analog-to-digital converter 216 is similarly sampled at 266 in the same manner as in step 240, and the resistance of printing element N of print line 18 is compared to $R_{MAX}$ at 268. If the printing element N of print line 18 has an acceptably low resistance, a flag is set for that printing element at 270. The program then checks at 272 to determine if the printing element index N has reached it maximum value. If the resistance of printing element N of print line 18 is too high, the program proceeds directly from 268 to 272 without first setting the flag for that print element. Thus, in steps 260–272, the printing elements of print line 18 corresponding to the printing elements of print line 16 that had an excessively high resistance are checked and flagged if they are suitable for use in printing. After the printing element N is checked for its maximum value, it is either incremented at 274 to repeat steps 260–272 until the final printing element is reached at which point the program proceeds from 272 to a sequence of printing steps, described below.

If the flag has not been set for a printing element of print line 16, and a flag has not been set to the corresponding printing element of print line 18, then that printing element has an excessively high resistance in both print line 16 and print line 18. Accordingly, the program defaults to using the corresponding printing element of print line 20 as described below. Alternatively, the print line 20 may also be checked before it is used for printing using substantially the same steps that were used to check the print lines 16, 18.

The printing operation begins with step 280 in which the microprocessor 202 causes the switch 210 to apply the +24 volt power to the printhead 12. The program then causes the microprocessor 202 to generate printhead data corresponding to the energization pattern of the printed elements on the printhead 12 and store that data in the image memory 204 at step 282. The printing element index N is then set to 1, and a scan line index M is set to the starting column of the printhead data in the memory 204 at 284. The program then begins the printing operation by determining if printing element 1 (since N is now equal to 1) of print line 16 is flagged. If so, the program causes the microprocessor 202 to load a data bit for scan line M (i.e., the first column of data) into printing element 1 of print line 16. Thus, at the end of step 288, printing element 1 of scan line 16 has been programmed if its resistance was found to be acceptably low in the steps described above. If the program determines at 286 that printing element 1 of print line 16 was not flagged, the program checks at 290 to determine if printing element 1 of print line 18 has been flagged. If so, data for scan line M-1 is loaded into printing element 1 of print line 18 at 292. The reason that the data is loaded into scan line M-1 is that the data in memory must be offset by one scan line to correspond to the spatial offset of print line 18 from print line 16. Specifically, the printhead data for scan line M is not loaded into print line 18 until the image formed by other printing elements of print line 16 has reached print line 18. At this time, the printhead data for the next scan line is being loaded into print line 16.

If the program determines at steps 286 and 290 that printing element N of neither print line 16 nor print line 18 are flagged, the program defaults to using the corresponding printing element of print line 20, as mentioned above. Accordingly, at step 292 data for scan line M-2 is loaded into printing element N of print line 20. Once again, the printhead data being loaded into print line 20 is offset by two scan lines from the printhead data being loaded into print line 16 because print line 20 is spatially offset from print line 16 by two scan lines. Alternatively, as mentioned above, the print line 20 may be checked before being used and, if found to be defective, the printer may be disabled.

After the data bit for the first printing element has been programmed, the program checks at 296 to determine if the printing element index N is equal to $N_{MAX}$. As before, $N_{MAX}$ corresponds to the final printing element of the printhead 12. After the initial pass through steps 280–292, N will not be equal to $N_{MAX}$ so that the program will increment N by 1 at 298 and return to 286 to program the next printing element of the printhead 12. When the final printing element has been programmed, the program will progress from 296 to 300. At that point, all of the printing element of the printhead 12 that are to be used in printing an image have been programmed. At step 300, the microprocessor 202 programs the counter/timer so that it can generate an appropriate strobe signal when triggered. However, the counter/timer 206 is not triggered until 302 when the microprocessor 202 generates an appropriate strobe signal. The program then causes the microprocessor to output a paper advance pulse at 304 on an output line 320 of the microprocessor 202. This pulse causes other portions of the printer not forming part of this invention to advance the print media pass the printhead 12 by a distance equal to the distance between adjacent print lines 16–20. The program then checks at 308 to determine if the image has been completely printed. If not, the scan line index M is incremented by 1 and N is set to 0 at 310, and the program returns to 286 to program the printing elements of the print lines 16–20. As mentioned above, because of the spatial offset between the print lines 16–20, the printing elements of print line 16 will be programmed with the incremented value of scan line M, while the printing elements of print line 18 will be programmed with printhead data from scan line M-1 and the printing elements of print line 20 will be programmed with printhead data from scan line M-2. When the program determines at 308 that the image has been completely printed, the program returns to 282 to generate and store printhead data for the next image to be printed, as explained above.

Figure 13A:
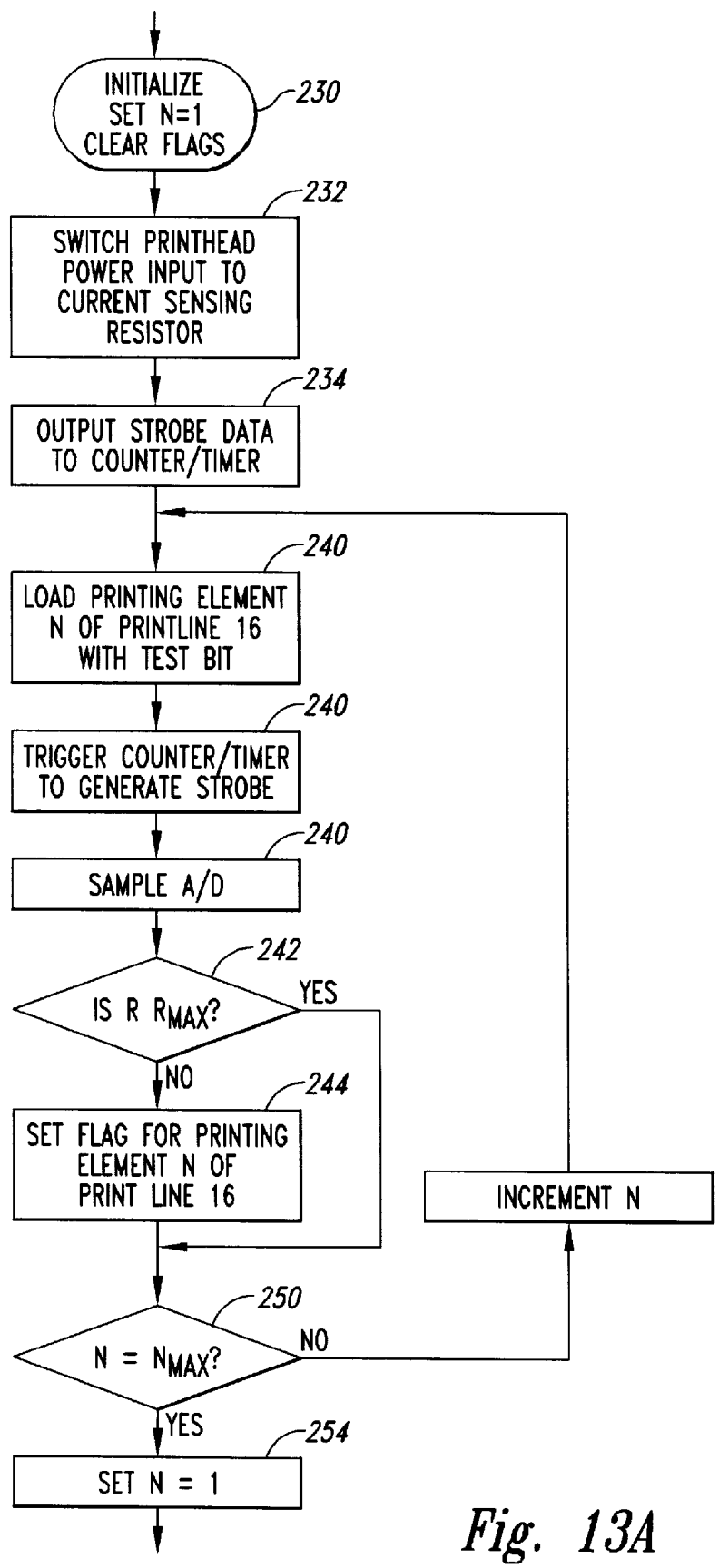
FIG. 13 is a flow chart showing the software that is executed by a processor used in the printhead control unit of FIG. 12.
Figure 13B:
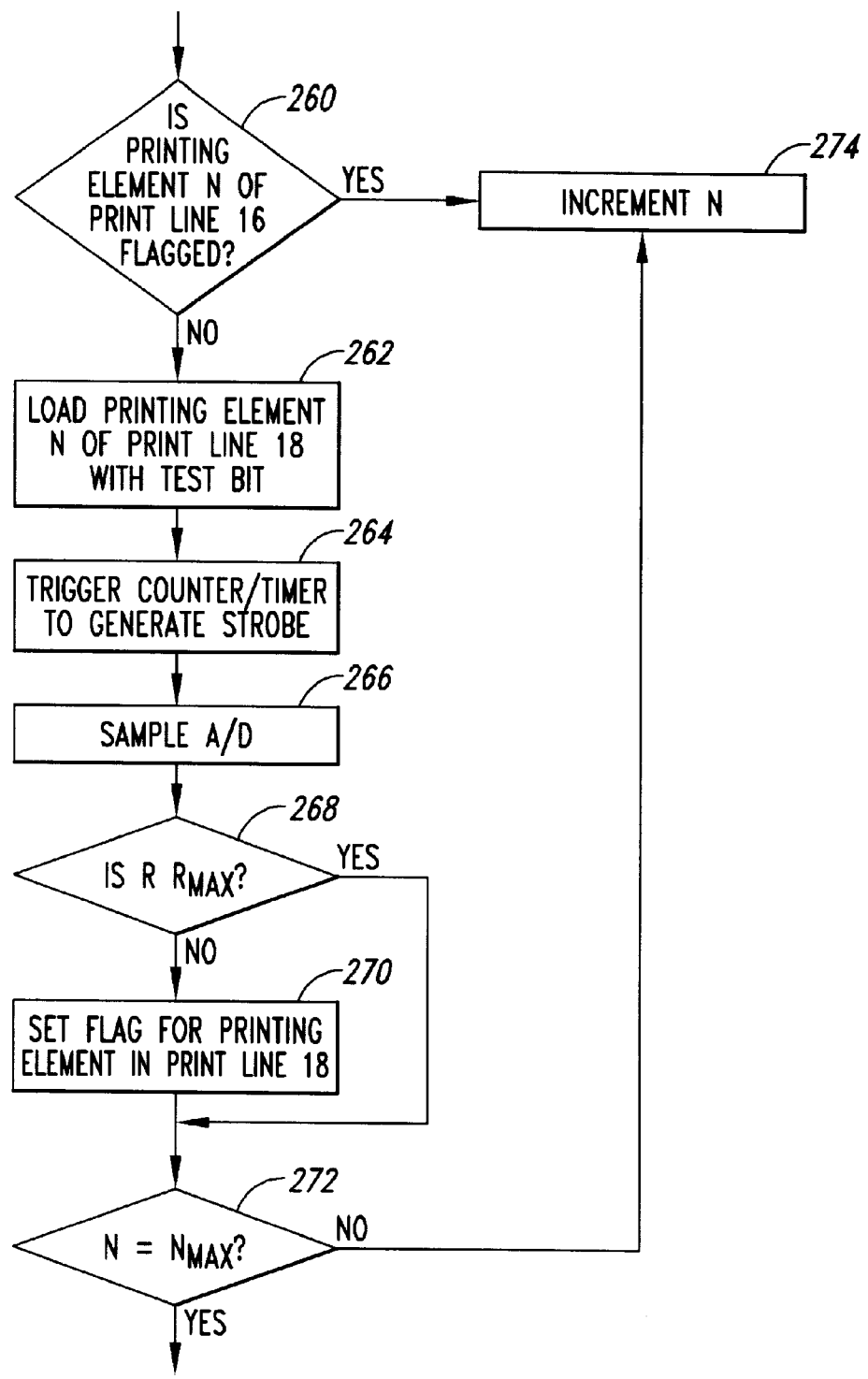
Figure 13C:
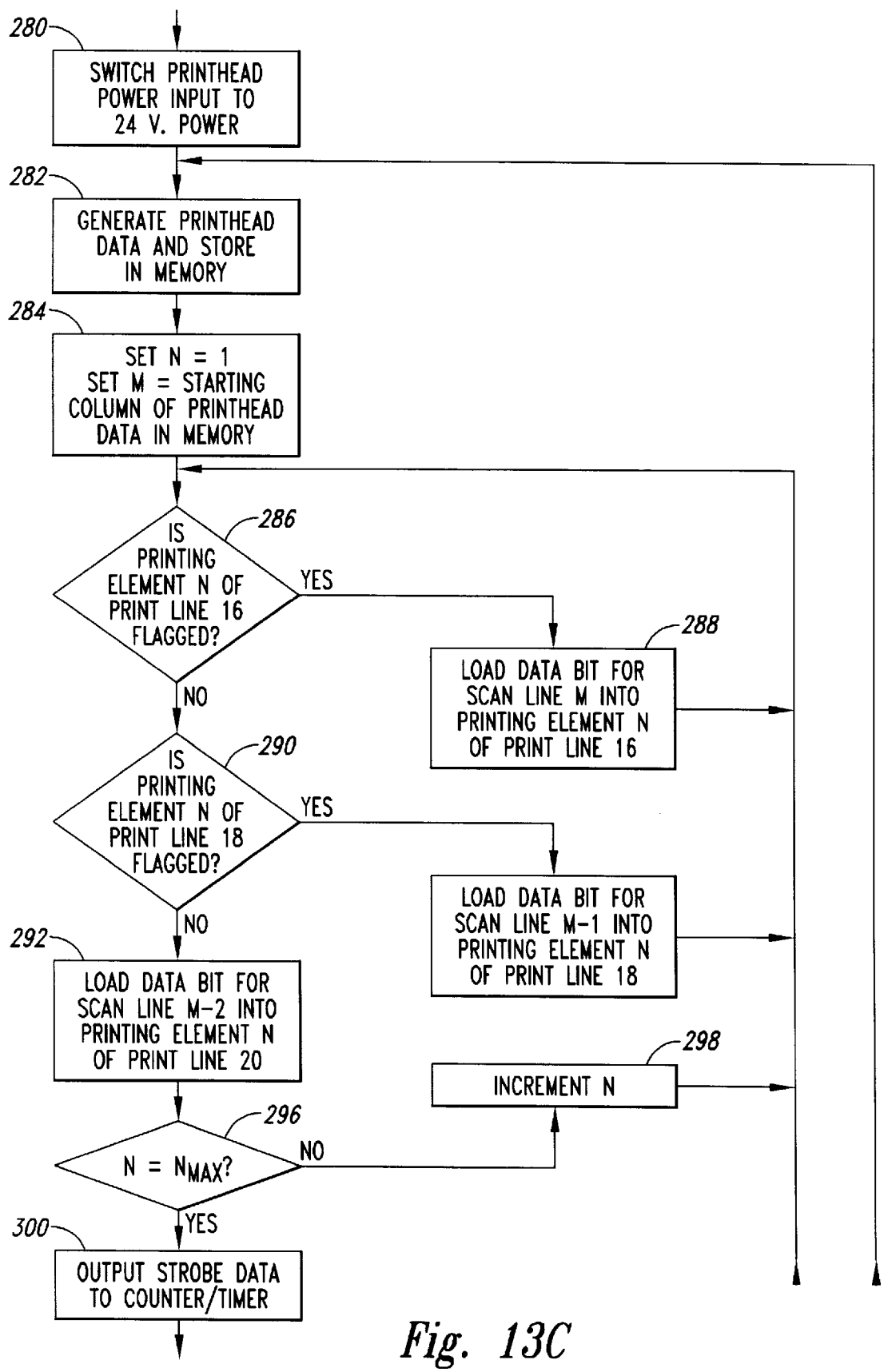
Figure 13D:
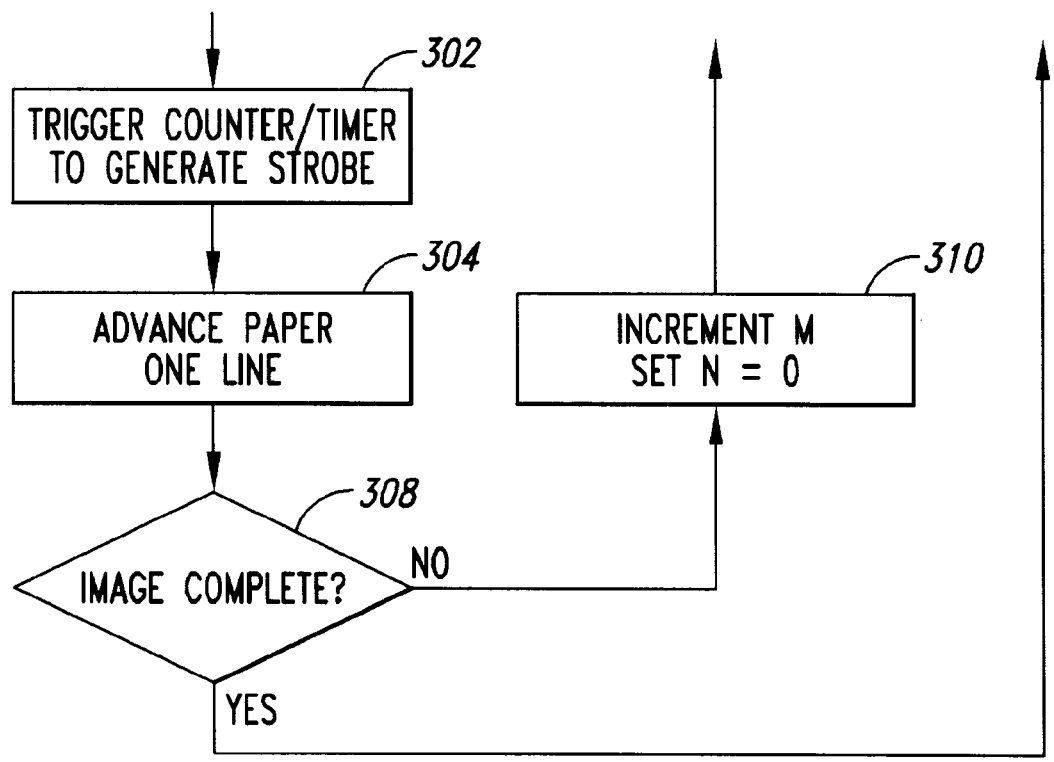

The inventive printhead control system of FIGS. 12 and 13A is thus able to continue operating despite the failure of the same printing element in up to two different print lines.

What is claimed is:

1. An apparatus for thermally printing on print media, comprising:
    a printhead having N number of spaced apart, parallel print lines, N being greater than one, and each of the print lines including a plurality of sequentially positioned printing elements of approximately similar construction selectively energizable to increase a temperature of a portion of the printhead; and
    a printhead controller operatively coupled to the printhead, the printhead controller receiving data corresponding to a monochrome image to be printed on the print media, the printhead controller selectively applying one of a plurality of selected heating signals to the printing elements in each of the print lines to thermally print each line of the monochrome image on the print media, wherein the heating signals for each line of the image provide one of a plurality of power levels to each of the N number of print lines.

2. The apparatus of claim 1 wherein the printhead contains three print lines, wherein the printhead controller includes an image memory containing printhead data corresponding to the heating signals, wherein the printhead controller loads the printhead data into the printhead with the printhead data from scan line column N from the memory coupled to print line 1 of the printhead, the printhead data from scan line column N-1 of the memory coupled to print line 2 of the printhead, and the printhead data from scan line column N-2 of the memory coupled to print line 3 of the printhead.

3. The apparatus of claim 1 wherein the printhead controller includes:
    an image memory; and
    a processor that receives image data corresponding to the monochrome image and being operatively coupled to the image memory, the processor storing the data corresponding to the monochrome image into the image memory in an order corresponding to an order that the printhead signals are applied to the printhead.

4. The apparatus of claim 1 wherein the printhead controller provides a print media advance signal to advance the print media across the printhead to superimpose the printing of each of the N number of print lines of each line of the monochrome image.

5. The apparatus of claim 1 wherein the printhead controller provides a print media advance signal to advance the print media across the printhead to alternately print each line of the monochrome image with a one of the N number of print lines.

6. The apparatus of claim 1 wherein the heating signals have one of eight possible values representing one of eight possible image densities.

7. An apparatus for thermally printing on print media, comprising:
    a printhead having N number of spaced apart, parallel print lines, N being greater than one, and each of the print lines including a plurality of sequentially positioned printing elements of approximately similar construction which are selectively energized to increase a temperature of a portion of the printhead;
    a printhead sensing circuit that determines a resistance of the printing elements of each of N number of print lines of the printhead and applies a heat signal to the printing elements in at least one of the N number of print lines and detects a faulty printing element; and
    a printhead controller that employs one of the N number of print lines to print a selected portion of an image if the printhead sensing circuit determines that at least one printing element in another at the N number of print lines is faulty.

8. The apparatus of claim 7 wherein the printhead sensing circuit compares a signal from potential faulty printing element in one of the N number of print lines to a signal from another printing element in another of the N number of print lines.

9. The apparatus of claim 7 wherein the printhead sensing circuit determines that the printing element is faulty if it has an excessively high resistance.

10. An apparatus for thermally printing on a print medium, comprising:
    a printhead having a plurality of spaced apart, parallel print lines, each of the print lines including a plurality of sequentially positioned printing elements that may be selectively energized to increase a temperature of a portion of the printhead; and
    a printhead controller operatively connected to the printhead to successively energize the printing elements in alternating ones of the print lines such that at least another of the print lines is operated between successive operations of any one of the print lines.

11. The apparatus of claim 10, further comprising:
    an image memory to store image data to be printed by the printhead, the image memory coupled to the printhead controller for retrieval of the image data.

12. The apparatus of claim 10 wherein the printhead includes first, second, and third print lines, the first print line being the closet of the first, second, and third print lines to an entry point of the print media and the third print line being the furthest of the first, second, and third print lines from the entry point of the print media and wherein the printhead controller is programmed to successively energize the first print line, followed by the third print line, followed by the second print line.

13. The apparatus of claim 10 wherein the printhead includes first, second, and third print lines, the first print line being the closet of the first, second, and third print lines to an entry point of the print media and the third print line being the furthest of the first, second, and third print lines from the entry point of the print media and wherein the printhead controller is programmed to successively energize the second print line, followed by the first print line, followed by the third print line.

14. The apparatus of claim 10 wherein the printhead is movable with respect to the print medium in a direction perpendicular to the parallel print lines.

15. A method of thermally printing an image on a print medium, comprising:

reading image data from a memory; and successively, alternatingly energizing a number of print lines in a printhead according to the image data to print a number of image lines, where the print lines are spaced apart and parallel and each of the print lines includes a number of sequentially positioned printing elements, and where a same one of the print lines is not operated in succession without another one of the print lines being energized in between the successive energizations of the same one of the print lines.

16. The method of claim 15 wherein the print lines comprise first, second, and third print lines, the first print line being the closet of the first, second, and third print lines to an entry point of the print media and the third print line being the furthest of the first, second, and third print lines from the entry point of the print media and wherein successively alternatingly energizing a number of print lines comprises repeating the following acts, in order, until the image is printed on the print medium:

energizing the first print line;

energizing the third print line following the energizing of the first print line, and energizing the second print line following energizing of the third print line.

17. The method of claim 15 wherein the print lines comprise first, second, and third print lines, the first print line being the closet of the first, second and third print lines to an entry point of the print media and the third print line being the furthest of the first, second and third print lines from the entry point of the print media and wherein successively alternatingly energizing a number of print lines comprises repeating the following acts, in order, until the image is printed on the print medium:

energizing the second print line;

energizing the first print line following the energizing of the second print line; and energizing the third print line following energizing of the first print line.

* * * * *